US010403996B2

(12) United States Patent
Pan et al.

(10) Patent No.: US 10,403,996 B2
(45) Date of Patent: Sep. 3, 2019

(54) MOBILE TERMINAL FITTING PROVIDING ELECTRIC CONNECTION WITH MOBILE TERMINAL

(71) Applicant: BAOTOU YOURAN NETWORK TECHNOLOGY CO., LTD., Baotou, Inner Mongolia (CN)

(72) Inventors: Jian Pan, Inner Mongolia (CN); Jinqiu Zhao, Inner Mongolia (CN)

(73) Assignee: BAOTOU YOURAN NETWORK TECHNOLOGY CO., LTD., Inner Mongolia (CN)

( * ) Notice: Subject to any disclaimer, the term of this patent is extended or adjusted under 35 U.S.C. 154(b) by 0 days.

(21) Appl. No.: 15/847,128

(22) Filed: Dec. 19, 2017

(65) Prior Publication Data

US 2018/0109024 A1   Apr. 19, 2018

Related U.S. Application Data

(63) Continuation-in-part of application No. 14/723,269, filed on May 27, 2015, now abandoned.

(30) Foreign Application Priority Data

Jul. 23, 2014  (CN) .......................... 2014 1 0351454
Aug. 4, 2014   (CN) ..................... 2014 2 0435094 U

(51) Int. Cl.
*H01R 25/00* (2006.01)
*H01R 27/02* (2006.01)
(Continued)

(52) U.S. Cl.
CPC ............ *H01R 12/777* (2013.01); *H01M 2/30* (2013.01); *H01M 10/425* (2013.01);
(Continued)

(58) Field of Classification Search
CPC ...... H01R 13/055; H01R 13/74; H01R 24/54; H01R 25/00; H01R 27/00; H01R 27/02;
(Continued)

(56) References Cited

U.S. PATENT DOCUMENTS 4,963,098 A   10/1990  Myer et al.
5,061,198 A   10/1991  Manabe et al.
(Continued)

FOREIGN PATENT DOCUMENTS

CN          1048126 A      12/1990
CN        201226490 Y       4/2009
(Continued)

OTHER PUBLICATIONS

International Search Report (ISR) dated Dec. 31, 2014 for International Application No. PCT/CN2014/084978, with English translation.
(Continued)

*Primary Examiner* — Hae Moon Hyeon
(74) *Attorney, Agent, or Firm* — Ladas & Parry LLP

(57) ABSTRACT

The present disclosure relates to a mobile terminal fitting and an electric connector for the same. The mobile terminal fitting comprises a case body, an electric connector and a circuit board. The case body includes a bottom plate and a side plate that can be separated from each other, with the mobile terminal disposed in an accommodating groove formed by the side plate and the bottom plate of the case body, wherein the side plate is deformable in shape to ensure that the case body is easy to be installed and removed. The electric connector, disposed on the case body, comprises a socket and a plug, and can guarantee the electrical connection between the charging cord/data cable of the mobile terminal and the mobile terminal in the case body of the mobile terminal fitting.

16 Claims, 5 Drawing Sheets

(51) Int. Cl.

| | | |
|---|---|---|
| *H01R 31/00* | (2006.01) | |
| *H01R 33/00* | (2006.01) | |
| *H01R 12/77* | (2011.01) | |
| *H01R 13/04* | (2006.01) | |
| *H01R 13/11* | (2006.01) | |
| *H01M 10/42* | (2006.01) | |
| *H04M 1/02* | (2006.01) | |
| *H01R 12/00* | (2006.01) | |
| *H01R 13/66* | (2006.01) | |
| *H01M 2/30* | (2006.01) | |
| *H01M 2/10* | (2006.01) | |
| *H01R 13/74* | (2006.01) | |

(52) U.S. Cl.
CPC ............. *H01R 12/00* (2013.01); *H01R 13/04* (2013.01); *H01R 13/113* (2013.01); *H01R 13/6658* (2013.01); *H01R 27/02* (2013.01); *H04M 1/0274* (2013.01); *H01M 2/1066* (2013.01); *H01R 13/74* (2013.01)

(58) Field of Classification Search
CPC ........ H01R 29/00; H01R 31/00; H01R 31/06; H01R 33/00; H01R 33/88; H01R 33/94
USPC ................................ 439/43, 300, 541.5, 638
See application file for complete search history.

(56) References Cited

U.S. PATENT DOCUMENTS

| | | | |
|---|---|---|---|
| 6,068,509 | A | 5/2000 | Lin |
| 6,296,518 | B1 | 10/2001 | Avery et al. |
| 7,927,142 | B2 | 4/2011 | Wang et al. |
| 8,052,469 | B2 | 11/2011 | Mao et al. |
| 8,506,324 | B2 | 8/2013 | Naufel et al. |
| 8,517,751 | B1 | 8/2013 | Golko et al. |
| 8,535,075 | B1 | 9/2013 | Golko et al. |
| 2004/0067689 | A1 | 4/2004 | Semmeling et al. |
| 2008/0227339 | A1 | 9/2008 | Lee |
| 2010/0029126 | A1 | 2/2010 | Ngo |
| 2012/0177967 | A1 | 7/2012 | Wang |
| 2013/0075149 | A1 | 3/2013 | Golko et al. |
| 2013/0217253 | A1 | 8/2013 | Golko et al. |
| 2013/0314880 | A1 | 11/2013 | Sun et al. |
| 2014/0335732 | A1 | 11/2014 | Oberski et al. |
| 2015/0155657 | A1 | 6/2015 | Golko et al. |

FOREIGN PATENT DOCUMENTS

| | | |
|---|---|---|
| CN | 201556810 U | 8/2010 |
| CN | 201927746 U | 8/2011 |
| CN | 201946650 U | 8/2011 |
| CN | 202103291 U | 1/2012 |
| CN | 202121636 U | 1/2012 |
| CN | 102651464 A | 8/2012 |
| CN | 202474498 U | 10/2012 |
| CN | 103579875 A | 2/2014 |
| CN | 302735699 S | 2/2014 |
| CN | 103872718 A | 6/2014 |
| CN | 203850862 U | 9/2014 |
| CN | 204118419 U | 1/2015 |
| EP | 0 330 497 A1 | 8/1989 |
| WO | 2011/150403 A1 | 12/2011 |
| WO | 2013/081222 A1 | 6/2013 |
| WO | 2014/071539 A1 | 5/2014 |

OTHER PUBLICATIONS

European Search Report dated Oct. 29, 2015 for EP Application No. 15 16 5013.
Search Report dated Dec. 21, 2015 for priority Appln. No. CN 201410351454.3.
Supplementary Search Report dated Jul. 1, 2016 for priority Appln. No. CN 201410351454.3.
A Notice of References Cited Form (PTO-892) mailed on Mar. 16, 2016 in connection with U.S. Appl. No. 14/723,269, and references cited therein.
A Notice of References Cited Form (PTO-892) mailed on Jan. 25, 2017 in connection with U.S. Appl. No. 14/723,269, and references cited therein.
A Notice of References Cited Form (PTO-892) mailed on Mar. 26, 2018 in connection with related U.S. Appl. No. 15/846,930, and references cited therein.
English abstract of CN 103872718 A.
English abstract of CN 1048126 A.
English abstract of CN 201556810 U.
English abstract of CN 201927746 U.
English abstract of WO 2014/071539 A1.
English abstract of CN 201946650 U.
English abstract of WO 2013/081222 A1.
English abstract of CN 202121636 U.
English abstract of CN 202474498 U.
English abstract of CN 103579875 A.
Brief explanation of CN 302735699 S.
English abstract of CN 202103291 U.
English abstract of CN 204118419 U.
English abstract of CN 201226490 Y.
English abstract of CN 203850862 U.
English abstract of CN 102651464 A.
Lex Friedman: Review: Best battery cases for the iPhone 5 : Macworld, Jun. 30, 2013, XP055224461, Retrieved from the Internet: URL:http.//www.macworld.com/article/2045268/review-best-battery-cases-for-the-iphone-5.html, 20 pages, [retrieved on Oct. 29, 2016].

MOBILE TERMINAL FITTING PROVIDING ELECTRIC CONNECTION WITH MOBILE TERMINAL

CROSS REFERENCE TO RELATED APPLICATION

This application is a continuation in part (CIP) of and claims priority to currently pending U.S. patent application Ser. No. 14/723,269 filed May 27, 2015.

BACKGROUND

Field of the Disclosure

The present disclosure relates to the field of mobile terminal fittings, particularly to a mobile terminal fitting and an electric connector for the same.

Background of the Disclosure

Mobile terminals (such as smart mobile phones and tablet PCs) have become increasingly popular. Various fittings applied to the mobile terminals, such as a mobile terminal protective case, have also emerged on the market. However, most of the existing fittings are just used to add a protective case or a protective cover to the surface of the mobile terminals so as to protect and beautify the mobile terminals, without making specific improvements on the actual use functions of the mobile terminals, which makes the mobile terminal fittings have a monotonous function and no extended functions.

Besides, the mobile terminal fittings as described above, when being used as a protective case, are mostly formed into a one-piece structure, which results in difficult installation and removal, making the mobile terminal fittings prone to be deformed and damaged after repeated installation and removal.

SUMMARY

The present disclosure provides a mobile terminal fitting and an electric connector for the same, so as to not only solve the problem that the traditional mobile terminal fittings have a single function and no extended functions, but also solve the problem that the traditional mobile terminal fittings are inconvenient to be removed and installed when they are used as a protective case.

In one embodiment, the present disclosure discloses a mobile terminal fitting, which comprises a case body, an electric connector and a circuit board. The case body has a bottom plate and a side plate. The side plate disposed around the bottom plate to form an accommodating groove by enclosing together with the bottom plate. The electric connector, disposed on the case body, comprises a socket and a plug, the plug being provided with an inserting portion and a first pin portion having a plurality of pins, the socket being provided with an accommodating portion and a second pin portion having a plurality of pins. The circuit board, disposed in or on the bottom plate of the case body, is electrically connected with the pins of the first pin portion and the pins of the second pin portion, respectively.

In another embodiment, the present disclosure also discloses an electric connector comprising a socket and a plug for the mobile terminal fitting. The plug is provided with an inserting portion having a plurality of electrical contacts and a first pin portion having a plurality of pins, the pins being respectively electrically connected with the electrical contacts and extending for a first distance in the vertical direction after leading out from the rear end of the inserting portion and then extending for a second distance in the horizontal direction toward the front end of the inserting portion; the socket is provided with an accommodating portion having a plurality of electrical contacts and a second pin portion having a plurality of pins, the pins being respectively electrically connected with the electrical contacts and extending for a third distance in the horizontal direction from the rear end of the accommodating portion.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The embodiments of the present disclosure will be described below in detail with reference to drawings and examples, by which the implementation process that the present disclosure applies the technical means to solve the technical problems and achieves the technical effects can be understood and implemented accordingly.

Some words and phrases as used in the description and claims refer to particular components. Those skilled in the art can and shall understand that hardware manufacturers may use different terms to refer to the same components. The description and claims are not to distinguish between the components based on the differences in names, but use the differences in functions of the components as a distinguishing criterion. The word "including/comprising" appearing throughout the description and claims is an open-style terminology, and shall be interpreted to mean "including but not limited to". "Substantially" means that those skilled in the art, within an acceptable error range, can solve said problems within a certain error range, and basically achieve said technical effects. Besides, the word or phrase "coupled" or "electrically connected" as used herein contains any direct or indirect electrically coupling means. Therefore, if it is described herein that a first device is coupled to a second device, it represents that the first device may be directly electrically coupled to the second device, or indirectly electrically coupled to the second device by other devices or coupling means. The following description describes the embodiments of the present disclosure; however, the following description still takes the general principles of the present disclosure as the purpose, instead of being intended to define the scope of the present disclosure. The scope of the present disclosure shall be as defined in the appended claims.

It also needs to be explained that the term "comprising", "including" or any other variation thereof is intended to cover a non-exclusive inclusion, such that a process, a method, a product or a system comprising/including a series of elements not only comprises/includes those elements, but also comprises/includes other elements not expressly listed, or further comprises/includes elements inherent for such a process, method, product or system. In the absence of more restrictions, an element defined by the statement "comprising/including a . . . " does not exclude the existence of additional identical elements in the process, method, product or system comprising/including the element.

Figure 1:
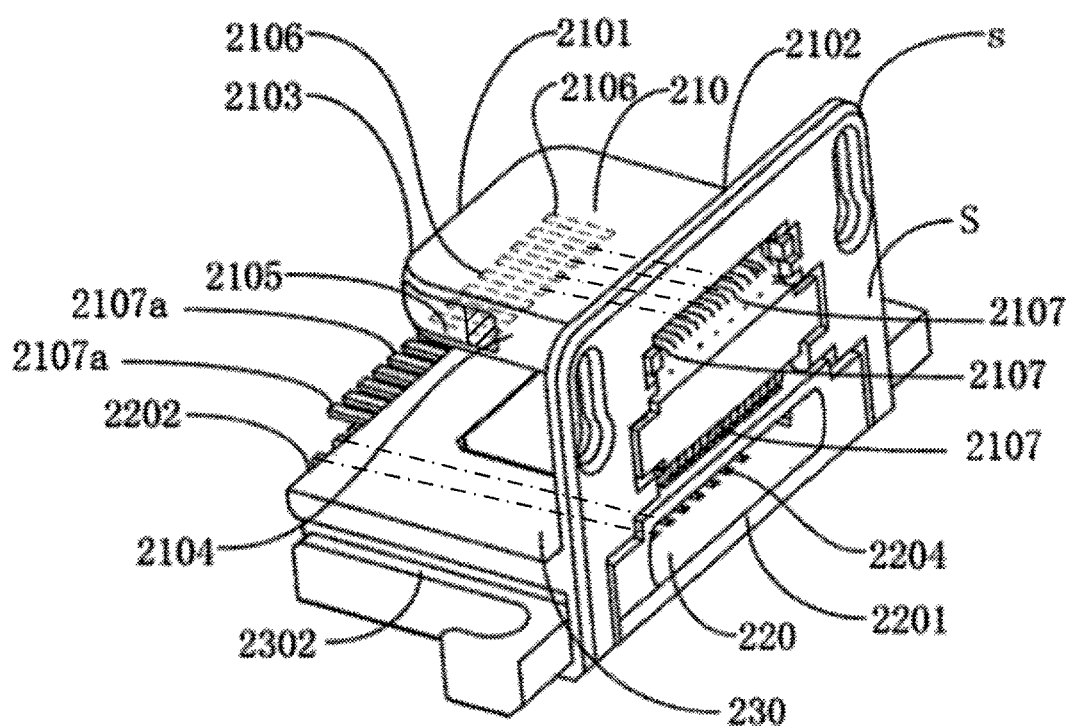
FIG. 1 is a perspective view of the electric connector of the mobile terminal fitting according the embodiment of the present disclosure.

As shown in FIG. 1, which is a perspective view of an electric connector for the mobile terminal fitting applied to a mobile terminal (such as a smart phone, a tablet computer, etc.) according to the embodiment of the present disclosure, the electric connector 20 includes a plug 210 and a socket 220. The electric connector 20 is used for electrically connecting the mobile terminal fitting 500 and the mobile terminal (not shown).

Figure 2:
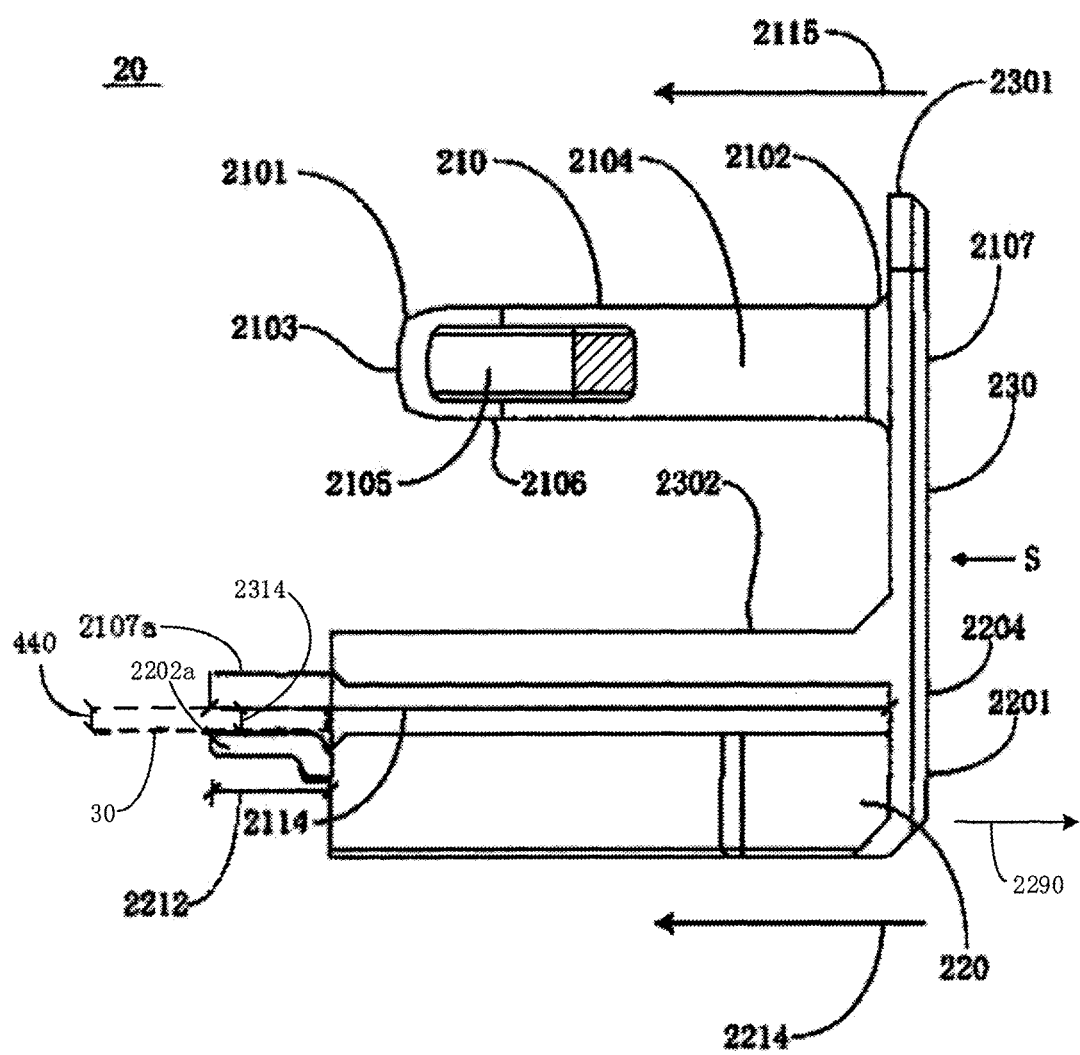
FIG. 2 is a side view of the electric connector of the mobile terminal fitting of the example according the embodiment of the present disclosure.
Figure 3:
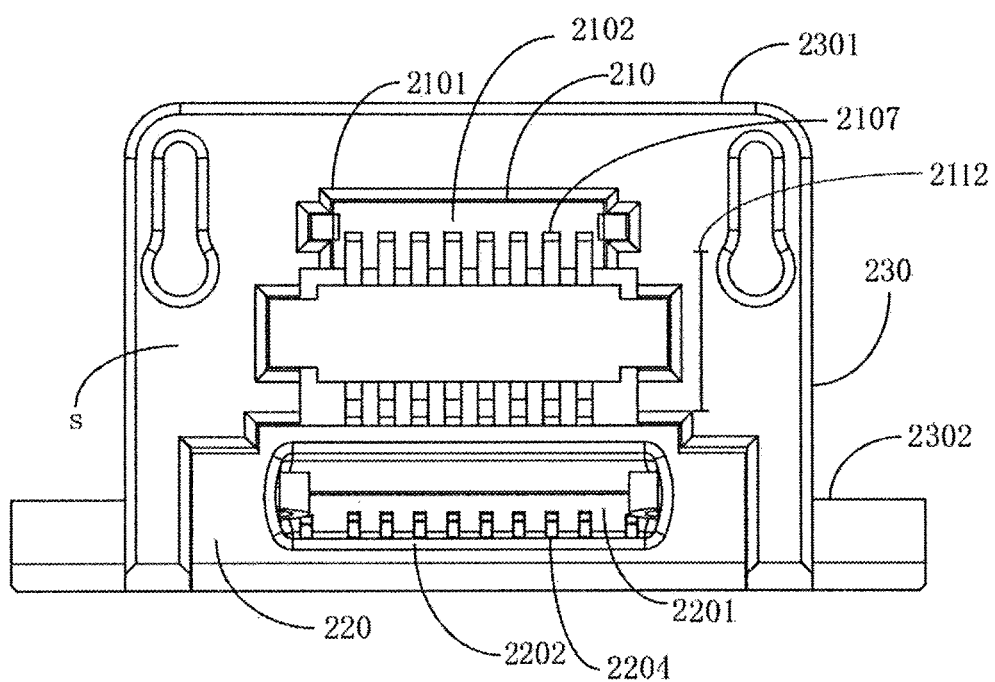
FIG. 3 is a side view of the electric connector of the mobile terminal fitting of the example according the embodiment of the present disclosure.

The plug 210 is provided with an inserting portion 2101 having a plurality of electrical contacts 2106 and a first pin portion 2102 having a plurality of pins 2107. The pins 2107 are respectively electrically connected with the electrical contacts 2106 and extend for a first distance 2112 (as shown in FIG. 3) in the vertical direction after leading out from the rear end of the inserting portion 2101 and then extend for a second distance 2114 (as shown in FIG. 2) in the horizontal direction toward the front end of the inserting portion 2101. The socket 220 is provided with an accommodating portion 2201 having a plurality of electrical contacts 2204, and a second pin portion 2202 having a plurality of pins 2202a (as shown in FIG. 2), the pins 2202a being respectively electrically connected with the electrical contacts 2204 and extending for a third distance 2212 (as shown in FIG. 2) in the horizontal direction from the rear end of the accommodating portion 2201. In this application, "the rear end of the inserting portion 2101" is the right end in FIG. 2, and "the rear end of the accommodating portion 2201" is the left end in FIG. 2. "the pins 2202a being respectively electrically connected with the electrical contacts 2204" means that the pins 2202a being electrically connected one to one with the electrical contacts 2204.

The inserting portion 2101 can be inserted into the socket of a mobile terminal. The accommodating portion 2201 is used for accommodating a plug such as a charging cord plug or a data transmission cable plug that corresponds to the socket of the mobile terminal; the pin 2107 of the first pin portion 2102 extends for a first distance 2112 in the vertical direction after leading out from the rear end of the inserting portion 2101, which extending in the vertical direction shortens the dimension of the electric connector 20 along the inserting portion 2101 compared with the traditional extending of the pin in the horizontal direction. Thus the overall size of the electric connector 20 is reduced, and the length of the mobile terminal fitting is also significantly reduced and the layout is more reasonable.

The first distance 2112 matches the distance from the lower edge 610 of the interface of the mobile terminal to the rear side 620 of the mobile terminal. This matching relationship can not only ensure that the plug 210 of the electric connector 20 may be inserted into the socket of the mobile terminal smoothly, but also make the connection between the mobile terminal and the electric connector 20 more compact and integral, saving the space, reducing the thickness of the electric connector 20 and the terminal mobile fitting.

As shown in FIG. 2, which is a side view of an electric connector for the mobile terminal fitting according to the embodiment of the present disclosure, the inserting direction 2115 of the plug 210 into the socket of the mobile terminal is parallel to the accommodating direction 2214 of the socket 220. The design can ensure that the socket 220 of the electric connector 20 of the present disclosure keeps consistent with the socket of the mobile terminal in direction while in use, and is more convenient compared with the prior art wherein the inserting direction of the plug of the electric connector is vertical to the accommodating direction of the socket.

As shown in FIG. 2, which is a side view of an electric connector for the mobile terminal fitting according to the example of the present disclosure, there is a fourth distance 2314 in the vertical direction from the portion 2107a of the pin 2107 of the plug 210 extending in the horizontal direction toward the front end of the inserting portion 2101 to the portion of the pin 2202a of the socket 220 extending in the horizontal direction. In order to ensure the electrical interconnection between the plug 210 and the socket 220, an electronic component needs to be disposed in the space formed by the fourth distance 2314 (the portion 2107a of the pins 2107 of the plug 210 and the portion of the pins 2202a of the socket 220), so as to establish the electrical interconnection between the plug 210 and the socket 220. A circuit board is often used in the mobile terminal fitting, i.e., an embodiment for the electronic component of the present disclosure is a circuit board; wherein the fourth distance 2314 matches the thickness 440 of the circuit board 30 in the mobile terminal fitting, i.e., the circuit board 30 in the mobile terminal fitting needs to be inserted into the space formed by the fourth distance 2314. This mutually matched size relationship can not only ensure that the plug 210 and the socket 220 are electrically interconnected, but also reduce the thickness of the electric connector effectively, and thus the thickness of the entire terminal mobile fitting is reduced. Disposing a circuit board in the space formed by the fourth distance 2314 is merely an exemplary embodiment of the present disclosure and will not limit the scope of protection of the present disclosure.

As shown in FIG. 1, which is a perspective view of an electric connector for the mobile terminal fitting according to the embodiment of the present disclosure, the portion 2107a of the pin 2107 of the plug 210 extending in the horizontal direction toward the front end of the inserting portion 2101 and the portion of the pin 2202a of the socket 220 extending in the horizontal direction are mutually stacked in the vertical direction. The "mutually stacked" design is merely an exemplary embodiment of this embodiment, and will not limit other examples. This can ensure that the accommodating portion 2201 is located just under the inserting portion 2101, i.e. just under the socket of the mobile terminal, which is the most convenient for operation. This design does not limit the present disclosure. As previously mentioned, only ensuring that the inserting direction 2115 of the plug 210 is parallel to the accommodating direction 2214 of the socket 220 will be enough to make the accommodating portion 2201 have the same accommodating direction with the socket of the mobile terminal.

As shown in FIGS. 2 and 3, which are side views of an electric connector for the mobile terminal fitting according to the embodiment of the present disclosure respectively, the portion of the pin of the first pin portion 2102 of the plug 210, extending in the vertical direction after leading out from the rear end of the inserting portion 2101, is in the same plane S with the outer side of the accommodating portion 2201 of the socket 220. This design is more reasonable compared with the prior art wherein there is a space between the rear end of the inserting portion 2101 and the side of the accommodating portion 2201. The size from the front portion of the inserting portion 2101 to the outer side of the accommodating portion 2201 is reduced, and thus the size of the electric connector 20 is reduced, and the length of the terminal mobile fitting is further reduced, saving materials on one hand and making the mobile terminal fitting more compact on the other hand.

As shown in FIG. 1, which is a perspective view of an electric connector for the mobile terminal fitting according to the embodiment of the present disclosure, an electric connector 20 for the mobile terminal fitting of the present disclosure further comprises a carrier plate 230, which includes a connecting body 2301 and a wrapping body 2302. The connecting body 2301, vertical to the plug 210 and the socket 220, makes the portion of the pin of the first pin portion 2102 extending in the vertical direction after leading out from the rear end of the inserting portion 2101 and the outer side of the accommodating portion 2201 of the socket 220 fixed on the inner side of the connecting body 2301; the wrapping body 2302, being of an inverted U shape, is vertical to the connecting body 2301, with the U-shaped space wrapping the socket 220 and the front end section fixed at the connecting body 2301. The carrier plate 230 provides an installation substrate for the plug 210 and the socket 220 to make them integrated with each other, facilitating removal and installation of the electric connector 20.

As shown in FIG. 1, which is a perspective view of an electric connector for the mobile terminal fitting according to the embodiment of the present disclosure, the inserting portion 2101 has an upper surface and a lower surface, with a plurality of electrical contacts on the lower surface. Because a single-sided electrical contact is often disposed in the socket of the mobile terminal corresponding to the plug, a traditional plug corresponding to the socket of the mobile terminal usually has a double-sided electrical contact. The plug structure having the same double-sided electrical contact can avoid the trouble that a user needs to distinguish between the front and rear sides of the plug, i.e., the electrical connection between the plug and the socket can be guaranteed no matter how the plug is inserted. While the plug 210 of the electric connector 20 of this embodiment is fixed and cannot be inverted, i.e., its front and rear sides have been set. Therefore, without designing a plug of the double-sided electrical contact structure, its use effects can still be achieved. Besides, compared with the plug with a double-sided electrical contact, the plug with a single-sided electrical contact saves more raw materials, and reduces the economic costs. Moreover, providing an electrical contact on the lower surface of the plug 210 can prevent dust and protect the electrical contact.

As shown in FIG. 2, which is a side view of an electric connector for the mobile terminal fitting according to the embodiment of the present disclosure, the inserting portion 2101 has one front end side 2103 and two lateral end sides 2104, with a smooth transition formed at the junction between the front end side 2103 and the two lateral end sides 2104. The two lateral end sides 2104 have a lead-in slot 2105, respectively, which is formed on one end into a depression on the lateral end side 2104, and smoothly extends on the other end to the smooth transition of the front end side 2103. This lead-in slot 2105 can guide the plug 210 smoothly into the socket of the mobile terminal.

As shown in FIG. 1, which is a perspective view of an electric connector for the mobile terminal fitting according to the embodiment of the present disclosure, the inserting direction 2115 of the inserting portion 2101 is different from the opening direction 2290 (as shown in FIG. 2) of the accommodating portion 2201. The design can ensure that the plug of a charging cord or a data transmission cable can be inserted into the accommodating portion 2201 very smoothly when the inserting portion 2101 is inserted into the socket of the mobile terminal, i.e. when the electric connector is connected with the mobile terminal, thus making the operation faster and more convenient.

Figure 4:
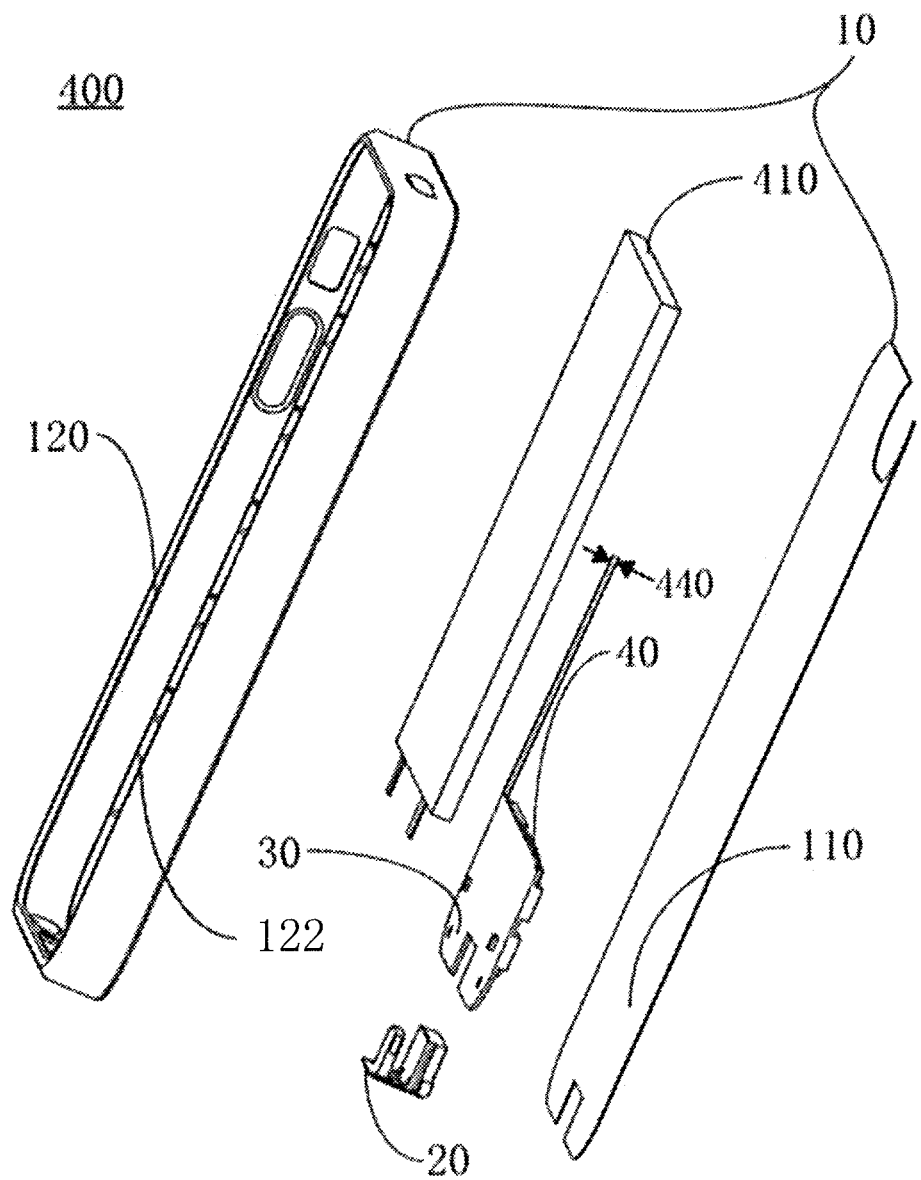
FIG. 4 is a schematic view of the disassembled structure of the mobile terminal fitting according the embodiment of the present disclosure.
Figure 5:
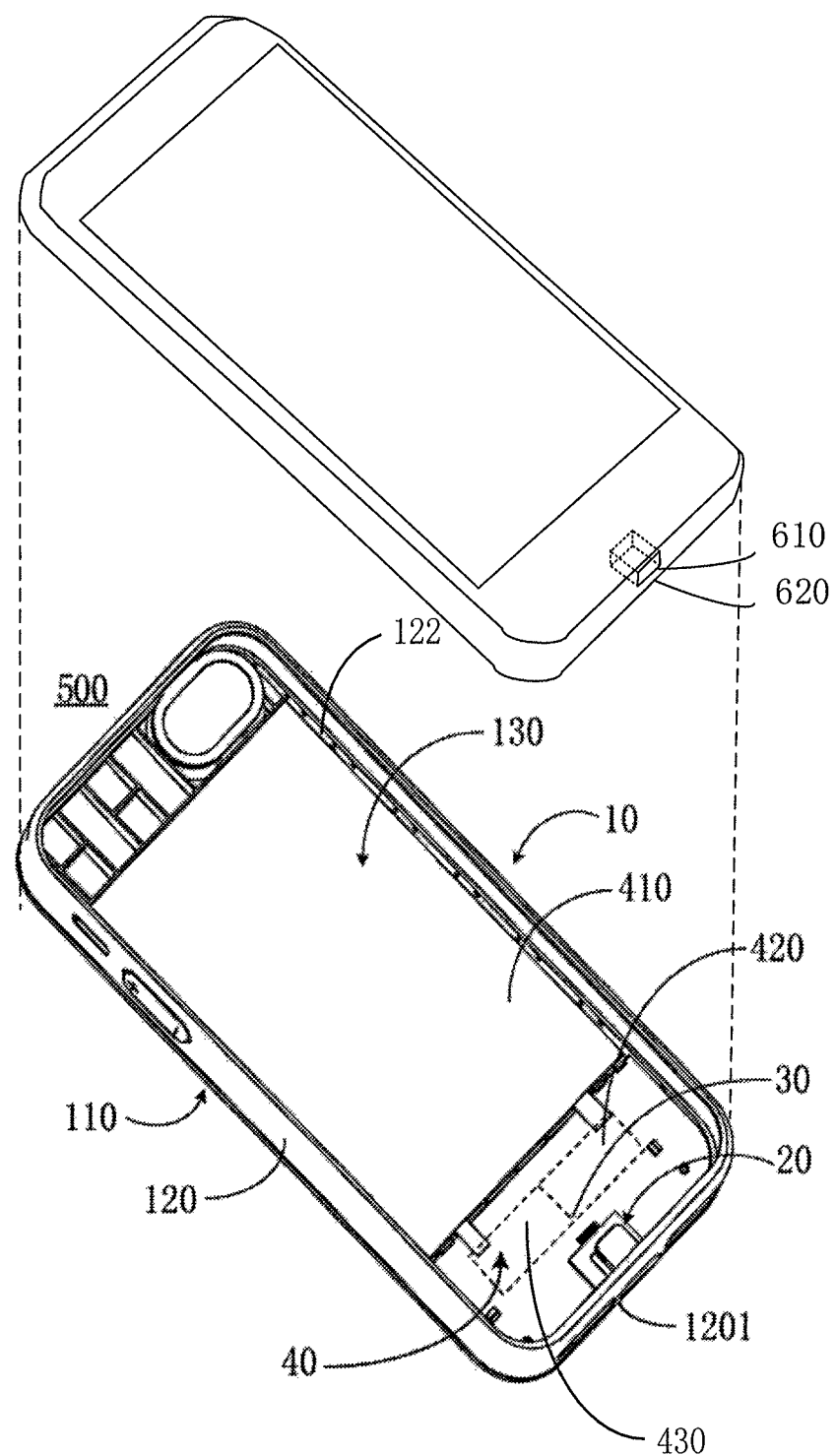
FIG. 5 is a schematic view of the assembled structure of the mobile terminal fitting according the embodiment of the present disclosure.

As shown in FIG. 4 and FIG. 5, FIG. 4 is a schematic view of the disassembled structure of a mobile terminal fitting according to the example of the present disclosure and FIG. 5 is a schematic view of the assembled structure of the mobile terminal fitting according the embodiment of the present disclosure, a mobile terminal fitting comprises a case body 10, an electric connector 20 and a circuit board 30.

The case body 10 has a bottom plate 110 and a side plate 120, with the side plate 120 disposed around the bottom plate 110 and forming an accommodating groove 130 by enclosing together with the bottom plate 110.

The electric connector 20 can be disposed on the case body 10, wherein the electric connector 20 corresponds to a positioning hole 1201 on the side plate 120, making the plug of a charging cord or a data transmission cable of the mobile terminal go through the positioning hole 1201 on the side plate 120 and inserted into the accommodating portion 2201 of the electric connector 20, thus guaranteeing the electrical connection between the mobile terminal and the charging cord or data transmission cable of the mobile terminal. In one embodiment, the electric connector 20 is disposed on the bottom plate 110 of the case body 10; certainly, this will not limit the scope of protection of the present disclosure, and the electric connector 20 can also be disposed on the side plate 120 of the case body 10. The structure of the electric connector 20 has been described in detail in the above embodiment of the electric connector for the mobile terminal fitting, and will not be provided with details here.

As shown in FIG. 1 and FIG. 5, the inserting portion 2101 of the plug 210 of the electric connector 20 faces toward the inside of the accommodating groove 130, and matches a corresponding socket in the mobile terminal in position and structure. "Matching in position" means that when the mobile terminal is inserted into the case body 10, the inserting portion 2101 is exactly inserted into the socket of the mobile terminal. "Matching in structure" means that the outline of the inserting portion 2101 matches the outline of the socket of the mobile terminal, ensuring the electrically connection between the inserting portion 2101 and the socket of the mobile terminal. The opening direction of the accommodating portion 2201 of the socket 220 of the electric connector 20 faces toward the outside of the accommodating groove 130, and corresponds to the socket in the mobile terminal in structure, i.e., a plug corresponding to the socket of the mobile terminal can be inserted into the accommodating portion 2201 smoothly, ensuring a electrically interconnection of the accommodating portion 2201 and the plug corresponding to the socket of the mobile terminal.

As mentioned above, the inserting direction 2115 of the inserting portion 2101 is different from the opening direction of the accommodating portion 2201.

The circuit board 30, disposed in or on the bottom plate 110 of the case body 10, is electrically connected with the portion 2107a of the pins 2107 of the first pin portion 2102 and the pins 2202a of the second pin portion 2202 of the electric connector 20, respectively. For example, in case of the circuit board 30 being disposed in the bottom plate 110 of the case body 10, it is necessary to the circuit board 30 is through leading wires electrically connected with the portion 2107a of the pins 2107 of the first pin portion 2102 and the pins 2202a of the second pin portion 2202.

The above mobile terminal fitting, through the electric connector 20 and the circuit board 30, can then provide electrical extension for the mobile terminal, and is no longer simply a case body protecting the mobile terminal. For example, the mobile terminal fitting provides charging, extended storage and near-field wireless communication and other functions.

The bottom plate 110 can have a hollow portion, so as to allow an electric extension device 40 such as a memory card or a wireless communication card to be installed therein. Certainly, if the protection function is not considered, these electric extension devices can also be directly disposed on the bottom plate.

As shown in FIG. 5, which is a schematic view of the assembled structure of a mobile terminal fitting according to the embodiment of the present disclosure, the accommodating groove 130 is used for accommodating the mobile terminal, playing a role in protecting the mobile terminal.

The plug 210 of the electric connector 20, matchable to the charging interface of the mobile terminal, can be electrically connected with the rechargeable battery 410 through the circuit board 30 immediately after it is inserted into the charging interface of the mobile terminal, while the rechargeable battery can be accommodated in or placed directly on the bottom plate 110 as a part of the circuit board.

Because the mobile terminal fitting provided by the example of the present disclosure is no longer simply a protective case body but also provides an electric connector on the case body, it is necessary to take into account the convenience of assembling the mobile terminal fitting onto the mobile terminal. The plug of the electric connector is to be inserted into the charging interface of the mobile terminal, which is thus to be disposed in the accommodating groove of the mobile terminal fitting. The mobile terminal is to be coupled with the plug of the electric connector on one hand, and to be tightly disposed in the accommodating groove on the other hand, and thus damage to the electric connector will be easily caused without good structure design. Therefore, the present disclosure provides several embodiments to solve the above problems.

First, according to an embodiment of the present disclosure, the bottom plate 110 can be designed to be separable from the side plate 120, the electric connector is disposed at a side end of the bottom plate 110, and the side plate 120 has a positioning hole corresponding to the electric connector. In this way, with the side plate separated from the bottom plate and the bottom plate as an open flat, a user can first make the mobile terminal close to the bottom plate and apply a force toward the electric connector to get the plug 210 of the electric connector 20 to be inserted into the socket (e.g. the charging interface) of the mobile terminal, and thus the socket (e.g. the charging interface) of the mobile terminal to be coupled with the plug of the electric connector, and then install the side plate. Because here the mobile terminal has been coupled with the plug of the electric connector, no damage will be caused to the electric connector while the side plate is installed.

Besides, according to another example of the present disclosure, no matter whether the bottom plate 110 is separable from the side plate 120, the side plate 120 can be designed to be deformable in shape. For example, the side plate 120, made of an elastic material, can be appropriately stretched outward while in use because the shape of the elastic material can be changed, which makes the formed accommodating groove expanded and facilitates placement of the mobile terminal into the accommodating groove to get coupled with the electric connector; then the side plate is released to naturally wrap the mobile terminal, and thus the mobile terminal can be conveniently removed.

In fact, the side plate 120 is preferably correspondingly slightly smaller than the outline of the mobile terminal in shape and size while not in use, and matches the sides of the mobile terminal in shape and size after elastic deformation. In this way, with its good expansion and contraction guaranteed by the elastic material, not only the installation and removal can be easily completed but also the wrapped mobile terminal can be more integral, facilitating operation of the mobile terminal.

Again for example, the side plate 120 can have at least one snap-in device 122 for achieving deformation, i.e., the side plate after snapping matches the sides of the mobile terminal in shape and size. The snap-in device 122 can ensure that the side plate 120 is slightly bigger than the mobile terminal in size when the snap-in device 122 is snapped open, and the snap-in device 122 is snapped shut after the mobile terminal is entirely placed into the side plate 120, and then the mobile terminal is completely wrapped, with the number of the snap-in device determined based on the size of the side of the mobile terminal.

The above examples are just further description of the deformable structure of the side plate 120 of the present disclosure and will not limit the side plate 120, and other deformable structures shall also be regarded as within the scope of protection of the present disclosure.

Besides, the bottom plate 110 and the side plate 120 can also be separated from each other, and interconnected in a snapping manner. This separable structure facilitates installation and removal of the side plate 120, and allows free mixing and matching of the bottom plate 110 and the side plate 120 according to personal preferences, adding fun to using the mobile terminal.

The above separable bottom plate 110 and side plate 120 is also just an embodiment of the present disclosure, and does not limit the present disclosure. In other embodiment of the present disclosure, when the side plate 120 is made of an elastic material, due to its contraction and expansion nature, there is no need to produce a case body 10 with the bottom plate 110 separable from the side plate 120, and the bottom plate 110 can also be integrated with the side plate 120. When the side plate 120 is bent, deformed and expanded, the mobile terminal is placed into the accommodating groove 130; thereafter, the side plate 120 contracts due to its elasticity, making the mobile terminal completely wrapped by the bottom plate 110 and the side plate 120, with the entire operation being simple and easy and the wrapping effect being excellent.

Typically, because the bottom plate 110 is to carry a circuit board and other electric devices, it is usually made of a rigid material that is not easily deformed, while the side plate 120 can be deformed; therefore, the electric connector 20 will be usually installed on the bottom plate 110, and then inserted into the socket of the mobile terminal, making the mobile terminal just flat on the bottom plate 110; finally, following the deformation of the side plate 120, the side plate 120 is disposed around the periphery of the mobile terminal, and then forms an accommodating groove 130 with the bottom plate 110 to get the mobile terminal wrapped into the case body 10. This deformable mobile terminal fitting is easier to be installed and removed.

As shown in FIG. 4, which is a schematic view of the disassembled structure of a mobile terminal fitting 400 according to the embodiment of the present disclosure, the circuit board 30 is a double-sided circuit board, the pin 2107a of the first pin portion 2102 of the electric connector 20 being electrically connected with a first-side circuit of the double-sided circuit board, the pin 2202a of the second pin portion 2202 of the electric connector 20 being electrically connected with a second-side circuit of the double-sided circuit board. This double-sided circuit board structure is easy to be installed, and allows plug-and-play, making the operation convenient.

As shown in FIGS. 4 and 5, which are schematic views of the disassembled and assembled structure of a mobile terminal fitting 400, 500 according to the embodiment of the present disclosure respectively, the mobile terminal fitting of this example further comprises an extension device 40, which is electrically connected with the circuit board 30 and includes a rechargeable battery 410, a memory card 420 and a wireless communication device 430. When the extension device 40 is disposed in the bottom plate 110 of the case body 10, i.e., the bottom plate 110 of the case body 10 and the extension device 40 are integrated with each other, lead processing needs to be performed on the bottom plate 110, so as to guarantee the electrical connection between the extension device 40 and the circuit board 30. In the embodiment of the present disclosure, the extension device 40 is disposed on the bottom plate 110 of the case body 10, i.e., each component of the extension device 40 is removable, which facilitates flexible configuration and can also guarantee the electrical connection relationship between the extension device 40 and the circuit board 30.

The battery 410, extending electric energy for the mobile terminal, may be a rechargeable lithium battery or other rechargeable batteries; this embodiment takes a lithium battery as an example for description, which will not limit the scope of protection of the present disclosure. The memory card 420, being a memory card that can extend the mobile terminal, may be an SD card, an MMC card, a PCIe flash card and a CF card. This embodiment takes the more common SD card as an example for description, which will not limit the scope of protection of the present disclosure. The wireless communication device 430 can provide the wireless communication service for a mobile terminal without a wireless communication device. Besides, the extension device 40 is used to extend the mobile terminal, and this example just takes electric energy extension, storage extension and wireless communication function extension as an example for description, and adding other extension components to the extension device 40 and making other forms of extension shall also be understood herein as belonging to the scope of the idea of the present disclosure.

The above description shows and describes some embodiments of the present disclosure; however, as previously mentioned, the present disclosure shall not be understood as being limited to the form disclosed herein, and other embodiments shall not be regarded as an exclusion but can be applied to various other combinations, amendments and environments instead, and alterations can be made based on the above teachings or the technology or knowledge in the related fields within the range of the conception of the present disclosure described herein. All the amendments and alterations made by those skilled in the art without departing from the spirit and scope of the present disclosure shall be within the scope of protection of the appended claims of the present disclosure.

What is claimed is:

1. A mobile terminal fitting, comprising:
   a case body, having a bottom plate and a side plate, the side plate being disposed around the bottom plate and forming an accommodating groove by enclosing together with the bottom plate;
   an electric connector, disposed on the case body, comprising:
      a plug, provided with an inserting portion having a plurality of electrical contacts and a first pin portion having a plurality of pins, wherein the pins of the first pin portion are respectively electrically connected with the electrical contacts of the inserting portion, and the pins, after leading out from a rear end of the inserting portion, extend in a vertical direction, and then the pins extend in a horizontal direction toward a front end of the inserting portion; and
      a socket, provided with an accommodating portion having a plurality of electrical contacts and a second pin portion having a plurality of pins, wherein the pins of the second pin portion are respectively electrically connected with the electrical contacts of the accommodating portion, and the pins extend in the horizontal direction from the rear end of the accommodating portion; and
   a circuit board, disposed in or on the bottom plate of the case body, and configured to electrically connect with the pins of the first pin portion and the pins of the second pin portion, respectively.

2. The mobile terminal fitting according to claim 1, wherein the side plate is deformable in shape.

3. The mobile terminal fitting according to claim 1, wherein the side plate is made of an elastic material, with the side plate after elastic deformation matching the sides of a mobile terminal in shape and size.

4. The mobile terminal fitting according to claim 1, wherein the side plate has at least one snap-in device, with the side plate after being snapped shut matching the sides of a mobile terminal in shape and size.

5. The mobile terminal fitting according to claim 1, wherein the case body has a bottom plate and a side plate that can be separated from each other, the electric connector being disposed at a side end of the bottom plate, the side plate having a positioning hole corresponding to the electric connector.

6. The mobile terminal fitting according to claim 1, further comprising an extension device electrically connected with the circuit board.

7. The mobile terminal fitting according to claim 1, wherein the circuit board is a double-sided circuit board, the pin of the first pin portion being configured to electrically connect with a first side of the double-sided circuit board, the pin of the second pin portion being configured to electrically connect with a second side of the double-sided circuit board.

8. The mobile terminal fitting according to claim 1, wherein the inserting portion of the plug faces toward the inside of the accommodating groove, with the inserting portion adapted for matching a corresponding socket in a mobile terminal in position and structure; an opening direction for accommodating portion faces toward the outside of the accommodating groove, with the accommodating portion adapted for corresponding to the socket in the mobile terminal in structure.

9. The mobile terminal fitting according to claim 1, wherein an inserting direction of the plug is parallel to an accommodating direction of the socket.

10. The mobile terminal fitting according to claim 1, wherein a portion of the pin of the first pin portion, extending in the vertical direction after leading out from the rear end of the inserting portion, is in a same plane with a front an outer side of the accommodating portion of the socket.

11. The mobile terminal fitting according to claim 1, further comprising a carrier plate, which provides an installation substrate for the plug and the socket to make them integrated with each other.

12. The mobile terminal fitting according to claim 1, wherein the inserting portion has one front end side and two lateral end sides, with a smooth transition formed at a junction between the front end side and the two lateral end sides; the two lateral end sides comprise a lead-in slot, respectively, which is formed on one end into a depression on the lateral end side, and smoothly extends on the other end to smooth transition of the front end side.

13. The mobile terminal fitting according to claim 1, wherein there is a gap in the vertical direction from a portion of the pins of the plug extending in the horizontal direction toward the front end of the inserting portion to a portion of the pin of the socket extending in the horizontal direction; the gap matches a thickness of the circuit board; the circuit board is disposed in the space formed by the gap.

14. The mobile terminal fitting according to claim 1, wherein a portion of the pin of the plug extending in the horizontal direction toward the front end of the inserting portion and a portion of the pin of the socket extending in the horizontal direction are mutually stacked in the vertical direction.

15. The mobile terminal fitting according to claim 1, wherein the pins of the first pin portion, after leading out from the rear end of the inserting portion, extend in a vertical direction a distance from the lower edge of the interface of a mobile terminal corresponding to the plug to the rear side of a mobile terminal.

16. The mobile terminal fitting according to claim 1, wherein the inserting portion has an upper surface and a lower surface, and the plurality of electrical contacts of the inserting portion are located on the lower surface.

* * * * *